United States Patent Office 2,851,370
Patented Sept. 9, 1958

2,851,370

PEARLESCENT TYPE COATING COMPOSITION

Robert E. Blank, Mayfield Heights, Ohio, assignor to The Sherwin-Williams Company, Cleveland, Ohio, a corporation of Ohio No Drawing. Application October 28, 1953
Serial No. 388,900

8 Claims. (Cl. 106—193)

This invention relates as indicated to pearlescent type coatings. More specifically, this invention relates to a coating composition exhibiting the multiple reflectivity of a pearled surface.

Many attempts have been made in the past to imitate the light reflective characteristics of natural pearl. The most successful pearl-like coating compositions have been those incorporating guanine, a very expensive material, in a film-forming vehicle. The problem now at hand has resolved itself to a search for a cheap and relatively common material to be used in pearlescent coating compositions. In these coating compositions which are designed to imitate the pearl finish, the index of refraction of the pearlescent pigments and the film-forming ingredients should be different. In the case of guanine, the index of refraction is generally so high relative to the index of refraction of the binder that the coating or film containing guanine is pearlescent to a desirable degree when utilizing a relatively small amount of guanine. Various materials possessing a flat crystalline type of structure, including mica, have been tried with varying degrees of success. However, nothing gave results even approximating that of guanine. The prior art has felt that the index of refraction had to be sufficiently different, otherwise there would be no effect. Indeed, if the binder was of an oil or lacquer type, then the multiple reflectivity of the coating was much less than if a casein or starch type binder had been used. The casein or starch type binders, although yielding a coating having better multiple reflectivity, gave a film having very poor film characteristics, such as poor washability, etc. This better multiple reflectivity is best explained in that casein or starch type binders have a very low index of refraction, while oil or lacquer type binders have a higher index of refraction approximating that of the flat crystalline or plate type pigments. The old compositions containing mica failed when used in a high index of refraction binder and gave poor films when used in a casein type binder.

It is, therefore, a principal object of this invention to provide a multiple reflective coating composition which provides a film of good characteristics, such as, good washability, good stability to light, and good adhesion to painted surfaces.

Still another object of this invention is to provide a multiple reflective coating composition that is easy to manufacture and use.

Another object of this invention is to provide a multiple reflective coating composition that is not only stable for long periods of time in a container but is also substantially noncorrosive.

Another object of this invention is to provide a multiple reflective coating composition that gives good multiple light reflectivity, regardless of what lacquer-type of binder is employed.

Other objects of this invention appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated, then, this invention comprises the provision of a multiple reflective coating composition comprising a film-forming binder and a lustering agent or pearlescent pigment which is characterized in that it has lamellar plates, in which composition the pigment to binder ratio by weight is from about 3:1 to 7:1.

A. PEARLESCENT OR LUSTERING MATERIALS

It has been found that certain inorganic materials which possess a flat surface type of crystal or lamellar plate structure may be successfully employed to produce a pearl-like coating. Examples of some of these are mica, lead acid phosphate, lead acid arsenate, zinc phosphate, lead pyrophosphate, zinc ammonium phosphate, and magnesium ammonium phosphate. In order to obtain the desired multiple reflectivity in the coating compositions, the lamellar plates of the lustering material should have a diameter across the face thereof of from about 1 to about 100 microns.

The following charts illustrate a typical distribution of particle size of various samples of mica useful in accordance herewith.

Chart I
MICA SAMPLE NO. 1

| Diameter in Microns | Incremental Percentage | Accumulative Percentage |
|---|---|---|
| 1 | 1.9 | 1.9 |
| 2 | 2.7 | 4.6 |
| 4 | 8.4 | 13 |
| 6 | 14 | 27 |
| 8 | 12 | 39 |
| 10 | 9 | 48 |
| 12 | 7 | 55 |
| 14 | 6 | 61 |
| 16 | 4 | 67 |
| 18 | 4 | 71 |
| 20 | 4.5 | 75.5 |
| 25 | 8.5 | 84 |
| 30 | 5 | 89 |
| 40 | 5.5 | 94.5 |
| 50 | 2.5 | 97 |
| 60 | 2 | 99 |
| 70 | .5 | 99.5 |

Chart II
MICA SAMPLE NO. 2

| Diameter in Microns | Incremental Percentage | Accumulative Percentage |
|---|---|---|
| 1 | 14 | 14 |
| 2 | 22 | 36 |
| 3 | 14 | 50 |
| 4 | 9 | 59 |
| 5 | 8 | 67 |
| 6 | 5 | 72 |
| 8 | 7 | 79 |
| 10 | 4 | 83 |
| 15 | 7 | 90 |
| 20 | 4.5 | 94.5 |
| 30 | 3 | 97.5 |
| 40 | 1 | 98.5 |
| 50 | 0.5 | 99 |
| 70 | 0.5 | 99.5 |

It can be seen from the above charts that a typical sample of lustering or pearlescent material (mica) may have particles having a mean diameter of from about 3 to 30 microns, but the individual particles or flakes may vary from about 1 micron to about 70 or more microns. Since it is not commercially feasible to obtain a material having particles of just one size, a practical range for size of particles in a given quantity of pigment has been found to be from about 1 micron to 100 microns. If it is desired to blend a pearlescent effect with a degree of glitter, then those pigment samples containing a higher proportion of particles in the upper range of particle size, i. e., 65 to 100 or more microns may be used in the proportions herein indicated. This effect is evidenced by a pearlescent appearing surface having individually recognizable glitter points where large size pigment particles occur in the film. The materials used to obtain the multiple reflectivity are desirably relatively transparent when viewed as a single macro crystal.

While finely divided mica, finely divided lead acid phosphate, lead acid arsenate, zinc phosphate, in bulk form, etc., do not appear to the eye transparent in air, these materials, however, are lustrous due to particle shape and crystal surface characteristics and also probably due to different indices of refraction along different axes.

These lamellar plates of lustering agent or pearlescent material are held together by a transparent binder having a different index of refraction from that of the lustering or pearlescent material. Although various materials have been found that give satisfactory results, the more useful material is mica, not only because of its cheapness, ready availability and very good stability to light, but also because mica yields a translucent type of coating composition. The other lustering agents, such as lead acid phosphate, yield approximately comparable results in respect of multiple reflectivity. Mica of the moscovite type, such as indian mica, is well suited for the purposes of this invention. The mica that is used to obtain only a pearlescent type finish must be kept within the physical size limits as set out previously. If the mica plates are too coarse, that is, having diameters over 100 microns, there will be obtained a coating composition or film exhibiting individual glitter points superimposed on a pearlescent background instead of the overall appearance of an even degree of reflectivity. If the predominating amount of the mica particles is too small, that is, having diameters under 1 micron, and the plate diameter approaches the thickness of the plate, it then becomes more like a standard extender pigment with the result that there is little or no pearlescent effect.

The lack of luster as the fineness increases is probably due to a lack of ability to orient in a substantially common plane in the film. Thus, spherical, cubical or other non-orientable pigments even though crystalline and transparent are not useful herein.

Where the prior art has stopped at relatively low proportions of mica or other lustering or pearlescent material having the desired lamellar characteristics in the binder of the lacquer, water-insensitive type, it was found that very high proportions of such mica to binder yielded these startling results. It was thought before that when the pigment to binder ratio was too high, the film would not hold together. Best results as taught by this invention when using the lustering agents and a lacquer binder were obtained when employing a pigment:binder ratio of from about 3:1 by weight to a pigment:binder ratio of about 7:1 by weight. Lower than a 3:1 by weight pigment:binder ratio yielded no pearlescent effect or merely a milky to clear film. Higher than a 7:1 pigment:binder ratio led to an eventual deterioration of the film because of the lack of binder for each individual particle of pigment. In a very satisfactory embodiment of this invention, a 5:1 pigment:binder ratio is employed.

As a general rule, the ratio of pearlescent pigment to binder will probably vary inversely as the difference in refractive indices of the binder and the pigment used. The greater the difference between the refractive indices the less pigment is required to give the desired effect. In one embodiment of this invention which uses mica as the lustering or pearlescent material and ethyl ether of hydroxyl ethyl cellulose as the lacquer type binder, both the binder and the mica have relatively close indices of refraction. Hence, it has been found that an extraordinarily high mica content, i. e., from 5:1 to 7:1 ratio, is required to achieve the desired effects.

Thus, it is apparent that the particle size of the lustering or pearlescent agent and the indexes of refraction of both the binders and the lustering or pearlescent agents are properties which should be considered in the most successful practice of this invention.

Comparison of Some Indices of Refraction:
  Guanine, $N_D$ ------------------------------- 1.9
  Mica, $N_D$ ---------------------------------- 1.6
  Ethyl cellulose, $N_D$ ----------------------- 1.5
  Chlorinated rubber, $N_D$ -------------------- 1.5

B. WATER-INSOLUBLE BINDERS

The binders useful in the practice of this invention are of the lacquer type, i. e., drying principally by evaporation of solvent or more generally, water-insoluble film-forming materials in an organic system. Examples of some of the cellulose lacquer binders useful herein are ethyl cellulose, nitro-cellulose, cellulose acetate, cellulose butyrate, cellulose acetate-sorbate, cellulose acetate-butyrate and ethoxy hydroxy ethyl cellulose.

Vinyl resins may also be employed to good advantage. Examples of some of these vinyl resins are, polyvinyl acetate, polyvinyl alcohol, polyvinyl chloride, co-polymers of vinyl halides and vinyl esters, e. g., vinyl chloride-vinyl acetate, polyvinyl butyral and polyvinylidene chloride and co-polymers thereof with vinyl chloride, vinyl cyanide, etc. Also included in the vinyl polymers class are the styrene co-polymers and polystyrene resins.

Another class of resins useful herein are the acrylates and methacrylates, such as, methyl acrylate, ethyl acrylate, propyl acrylate, methyl methacrylate, ethyl methacrylate, propyl methacrylate and butyl methacrylate.

Other resins which find use herein are the allyl resins formed by esterification or etherification reactions from allyl alcohol, e. g., allyl phthalate, allyl maleate, allyl starch, etc.; resins based on natural rubber, chlorinated rubber; and resins based on synthetic rubber. Thus, almost any film-forming material drying primarily by solvent evaporation, may be used herein. A particularly suitable binder which may be used along with a lustering or pearlescent pigment, such as, mica, is ethoxy hydroxy ethyl cellulose.

The volatile portion of this novel pearlescent coating composition may be any liquid which is suitable for putting the binder resin in solution. It is felt that the solvent system should evaporate slowly enough to give the pearlescent or lustering flakes the opportunity to leaf in order to secure the maximum amount of pearlescent and apparent translucence. In general, almost all low boiling (175° F. to 550° F.) esters, aromatic hydrocarbons, aliphatic ketones and chlorinated hydrocarbons, etc. and combinations thereof may be used, as long as the rate of evaporation is slow enough; and these may be greatly improved in solvent power by admixing with relatively small amounts of the lower aliphatic alcohols such as methanol, ethanol, propanol, butanol, etc. Examples of some of these solvents are: xylene, mineral spirits, butyl acetate, isopropyl alcohol, acetate of mono-ethyl ether of ethylene glycol, mono-ethyl ether of ethylene glycol and high flash naphtha. The pearlescent pigment-binder combination particularly suitable herein (mica-ethyl ether of hydroxy ethyl cellulose), may be employed very satisfactorily in a solvent blend of 90% mineral spirits and 10% mono-ethyl ether of ethylene glycol. When the binder content of the complete coating composition is from about 3% to about 10% by weight, the lacquer-type binders should give a sufficiently viscous solution so that when pigment is dispersed at the proper pigment:binder ratio, a satisfactory material is produced that will lay down a thin film. After the application of the film and the evaporation of solvents, the film becomes very insensitive to water and moist air. Prior pearlescent paints or compounds for use on painted walls, wallpaper, etc. were of the water-sensitive type giving a far from durable finish.

It has been found convenient to formulate these coating compositions by admixing the binder and solvent to a binder content of about 5% by weight. From 3 to 7 times the weight of binder is the weight of lustering or pearlescent material which is to be added to this composition. Upon the dispersion of this quantity of pigment, the resultant coating composition may be too thick for practical application. If this is the case, then it is convenient to dilute the entire mass by the addition of more solvent until the proper application consistency has been achieved.

In general, at total solids concentrations in excess of 25 to 30% total solids (binder and pigment) there is a tendency to destruction of pearlescence and desired film translucence due to unnecessary superimposing of pigment particles upon one another.

On the basis of binder alone, it has been found that a most satisfactory binder content of the entire composition is from about 4% to about 7% by weight of the entire composition.

In general, the total solids (binder plus pigment) of these compositons ranges from about 15% to about 25% on a weight basis.

When mica is the lustering or pearlescent material, it is advisable to use the cleanest and whitest type of wet ground mica to obtain optimum results. If it is desired to color the coating compositions, only relatively transparent colors should be employed, such as phthalocyanine blue, phthalocyanine green, transparent ferric hydrate brown, etc. These color pigments may be added up to approximately 2% by weight of the pearlescent pigment although smaller amounts usually suffice. It is desired that the pearlescent pigment should be merely tinted and not heavily colored. Above the 2% range, these transparent colors tend to destroy the pearlescent effect of the lustering pigment. Opaque pigments may be added at very low concentrations for coloring the compositions. The concentration in this case should be approximately ¼ of 1% or less by weight of the pearlescent pigment.

Suspending agents along with volatile anti-oxidants in solution may be added, and these materials should also be kept at a concentration less than 1% by weight of the mica. Plasticizers may be added so long as the pigment:total binder ratio is maintained. Thus, contrary to prior belief, it has been found that excessive amounts of lustering or pearlescent pigments based on the weight of lacquer type binders give unexpected results. The films produced by these compositions exhibit very good characteristics, such as, exceptional light stability and washability along with the desired pearlescent effects.

To better illustrate the novel effects obtained in the practice of this invention, various examples now follow, but these illustrations and examples should not be construed as limiting the invention to the scope thereof as modifications will become obvious to those skilled in the art.

In the following tables, comparative results obtained at various pigment:binder ratios are shown. In compounding these examples, a 10% solution of binder in solvent was blended with pigment in an amount to yield the desired pigment:binder ratio. At the higher concentrations of pigment, it was found necessary to cut the viscosity of the coating composition with additional solvent to allow painting out of test panels. Thus, additional solvent may be added where necessary to reduce the viscosity to an application consistency, i. e., from 98 to 125 secs. at 77° F. on a #4 Ford cup.

EFFECT OF PEARLESCENT PIGMENT TO LACQUER BINDER WEIGHT RATIO ON PEARLESCENCE

Table I

In the following series of tests mica was used as the pigment and ethoxy hydroxy ethyl cellulose as the binder. The solvent in this case was a solvent blend of 9 parts by weight of mineral spirits and 1 part isopropyl alcohol.

| Example No. | Mica to Binder Weight Ratio | Pearlescent Effect |
|---|---|---|
| 1 | 1:1 | None. |
| 2 | 2:1 | None. |
| 3 | 3:1 | None. |
| 4 | 4:1 | Fair. |
| 5 | 5:1 | Good. |
| 6 | 6:1 | Good. |
| 7 | 7:1 | Good. |
| 8 | 8:1 | Film Impaired. |

Table II

In the following series of tests lead acid phosphate was used as the pigment and ethoxy hydroxy ethyl cellulose as the binder. The solvent in this case was a solvent blend of 9 parts by weight of mineral spirits and 1 part of isopropyl alcohol.

| Example No. | Lead Acid Phosphate to Binder Weight Ratio | Pearlescent Effect |
|---|---|---|
| 1 | 0.25:1 | None. |
| 2 | 0.5:1 | None. |
| 3 | 1:1 | None. |
| 4 | 2:1 | None. |
| 5 | 3:1 | None. |
| 6 | 4:1 | Some. |
| 7 | 5:1 | Fair. |
| 8 | 6:1 | Good. |
| 9 | 7:1 | Good. |
| 10 | 8:1 | Film Impaired. |

Table III

In the following series of tests mica was used as the pigment and ethyl cellulose as the binder. The solvent in this case was mono ethyl ether of ethylene glycol.

| Example No. | Mica to Binder Weight Ratio | Pearlescent Effect |
|---|---|---|
| 1 | 1:1 | Gloss. |
| 2 | 2:1 | Gloss. |
| 3 | 3:1 | Fair. |
| 4 | 4:1 | Fair. |
| 5 | 5:1 | Good. |
| 6 | 6:1 | Good. |
| 7 | 7:1 | Good. |
| 8 | 8:1 | Film Impaired. |

Table IV

In the following series of tests mica was used as the pigment and butyl methacrylate polymer as the binder. The solvent in this case was a solvent blend of 9.5 parts of mineral spirits and 0.5 part acetate of mono ethyl ether of ethylene glycol.

| Example No. | Mica to Binder Weight Ratio | Pearlescent Effect |
|---|---|---|
| 1 | 1:1 | None. |
| 2 | 2:1 | None. |
| 3 | 3:1 | Fair. |
| 4 | 4:1 | Fair. |
| 5 | 5:1 | Good. |
| 6 | 6:1 | Excellent. |
| 7 | 7:1 | Excellent. |

Table V

In the following series of tests mica was used as the pigment and nitrocellulose as the binder. The solvent in this case was a solvent blend of 50 parts mineral spirits, 25 parts xylene, 15 parts butyl acetate and 10 parts isopropyl alcohol.

| Example No. | Mica to Binder Weight Ratio | Pearlescent Effect |
|---|---|---|
| 1 | 1:1 | None. |
| 2 | 2:1 | None. |
| 3 | 3:1 | Fair. |
| 4 | 4:1 | Fair. |
| 5 | 5:1 | Fair. |
| 6 | 6:1 | Fair Plus. |

*Table VI*

In the following series of tests mica was used as the pigment and natural rubber as the binder. The solvent in this case was high flash naphtha.

| Example No. | Mica to Binder Weight Ratio | Pearlescent Effect |
|---|---|---|
| 1 | 1:1 | None. |
| 2 | 2:1 | None. |
| 3 | 3:1 | Some. |
| 4 | 4:1 | Fair. |
| 5 | 5:1 | Fair. |
| 6 | 6:1 | Good. |

It should be noted that best results were obtained when the pearlescent pigment to binder weight ratio was from about 4:1 to about 6:1. At 7:1 ratio, the pearlescent or multiple reflectively effect was usually still good, but in most cases an 8:1 ratio began to yield poor films, due to a deficiency of binder for maintaining continuity. The pearlescent effects as obtained in the various tables were all comparisons to a standard pearlescent finish made using a guanine-containing coating composition.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A pearlescent coating composition comprising a water-insoluble film-forming lacquer and mica having a particle size ranging from 1 to 100 microns, in which composition the pearlescent pigment to binder ratio by weight is from about 3:1 to about 7:1.

2. A pearlescent coating composition comprising a water-insoluble film-forming lacquer and mica having a particle size ranging from 1 to 100 microns, in which composition the pearlescent pigment to binder ratio by weight is about 5:1.

3. A pearlescent coating composition comprising a water-insoluble film-forming lacquer and mica, the major portion of said pigment being composed of lamellar crystals of particle size ranging from 1 to 100 microns, in which composition the pearlescent pigment to binder ratio by weight is from about 3:1 to about 7:1.

4. A pearlescent coating composition comprising a cellulose lacquer and mica, the major portion of said pigment being composed of lamellar crystals of particle size ranging from 1 to 100 microns, in which composition the pearlescent pigment to binder ratio by weight is from about 3:1 to about 7:1.

5. The composition of claim 1 wherein said water-insoluble film-forming binder is ethoxy hydroxy ethyl cellulose.

6. The composition of claim 1 wherein said water-insoluble film-forming binder is butyl methacrylate.

7. The composition of claim 1 wherein said water-insoluble film-forming binder is a synthetic rubber.

8. A pearlescent coating composition comprising a mixture of ethoxy hydroxy ethyl cellulose and mica flakes having a diameter across the face thereof of from about 1 to 100 microns, in which composition the mica to ethyl ether of hydroxy ethyl cellulose ratio by weight is approximately 5:1.

References Cited in the file of this patent

UNITED STATES PATENTS

| | | |
|---|---|---|
| 294,661 | Mowbray | Mar. 4, 1884 |
| 398,519 | Lee | Sept. 11, 1888 |
| 834,739 | Lilienfeld | Oct. 30, 1906 |
| 978,394 | Passeau Feil | Dec. 13, 1910 |
| 1,415,076 | Williams | May 9, 1922 |
| 1,812,283 | Caprio | June 30, 1931 |
| 1,922,548 | Mattin | Aug. 15, 1933 |
| 2,085,512 | Schneider | June 29, 1937 |
| 2,124,611 | Dreyfus | July 26, 1938 |
| 2,199,557 | Charlton | May 7, 1940 |
| 2,311,533 | Gertzog et al. | Feb. 16, 1943 |
| 2,363,570 | Caprio | Nov. 28, 1944 |
| 2,570,408 | Van Gorder et al. | Oct. 9, 1951 |
| 2,653,108 | Oakley | Sept. 22, 1953 |
| 2,713,004 | Greenstein | July 12, 1955 |

OTHER REFERENCES

Decker: "Industrial Finish," March 1949, pp. 96–98.

Mattin: "Industrial Finish" 25, #7, May 1949, pp. 60, 62, 66, 68 and 70.